Aug. 15, 1933. J. HARTNESS 1,922,849
GAUGING OF SCREW THREADS
Filed June 21, 1928 7 Sheets-Sheet 4
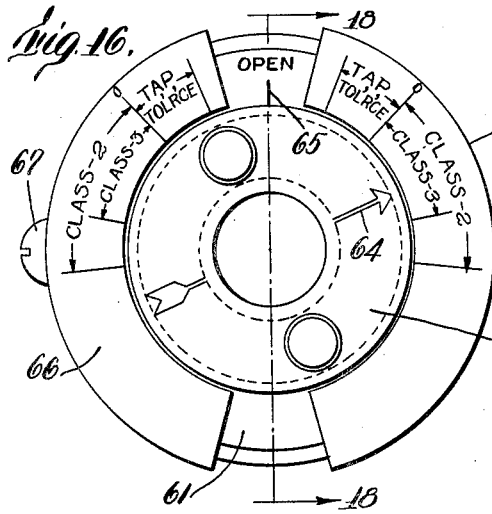
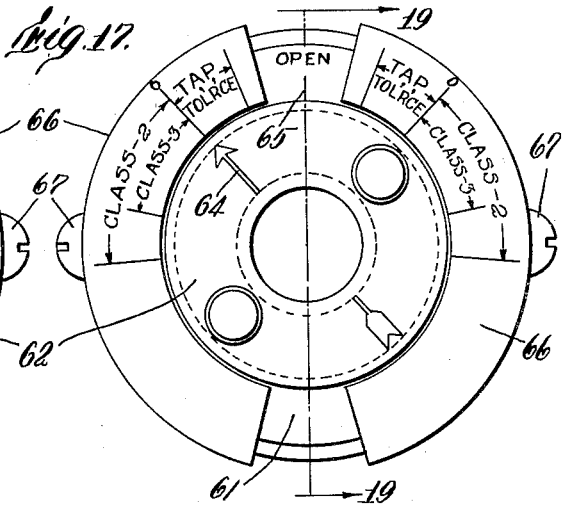
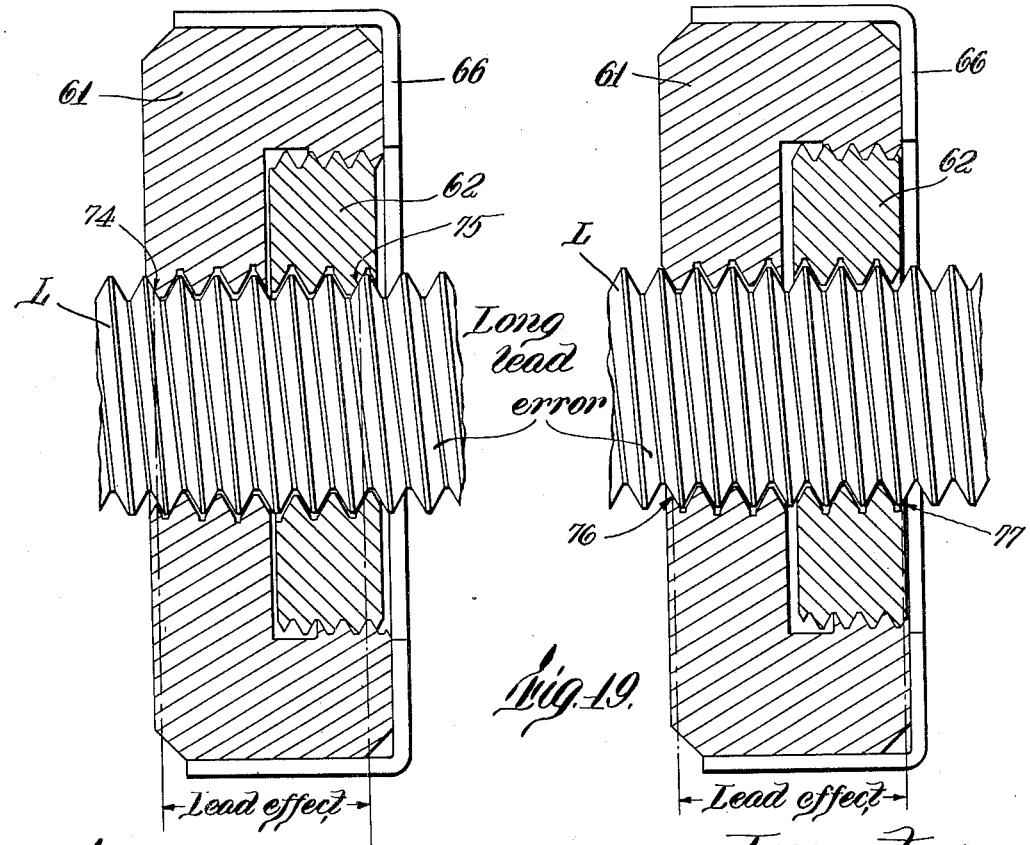
Inventor:
James Hartness Aug. 15, 1933.   J. HARTNESS   1,922,849
GAUGING OF SCREW THREADS
Filed June 21, 1928   7 Sheets-Sheet 5

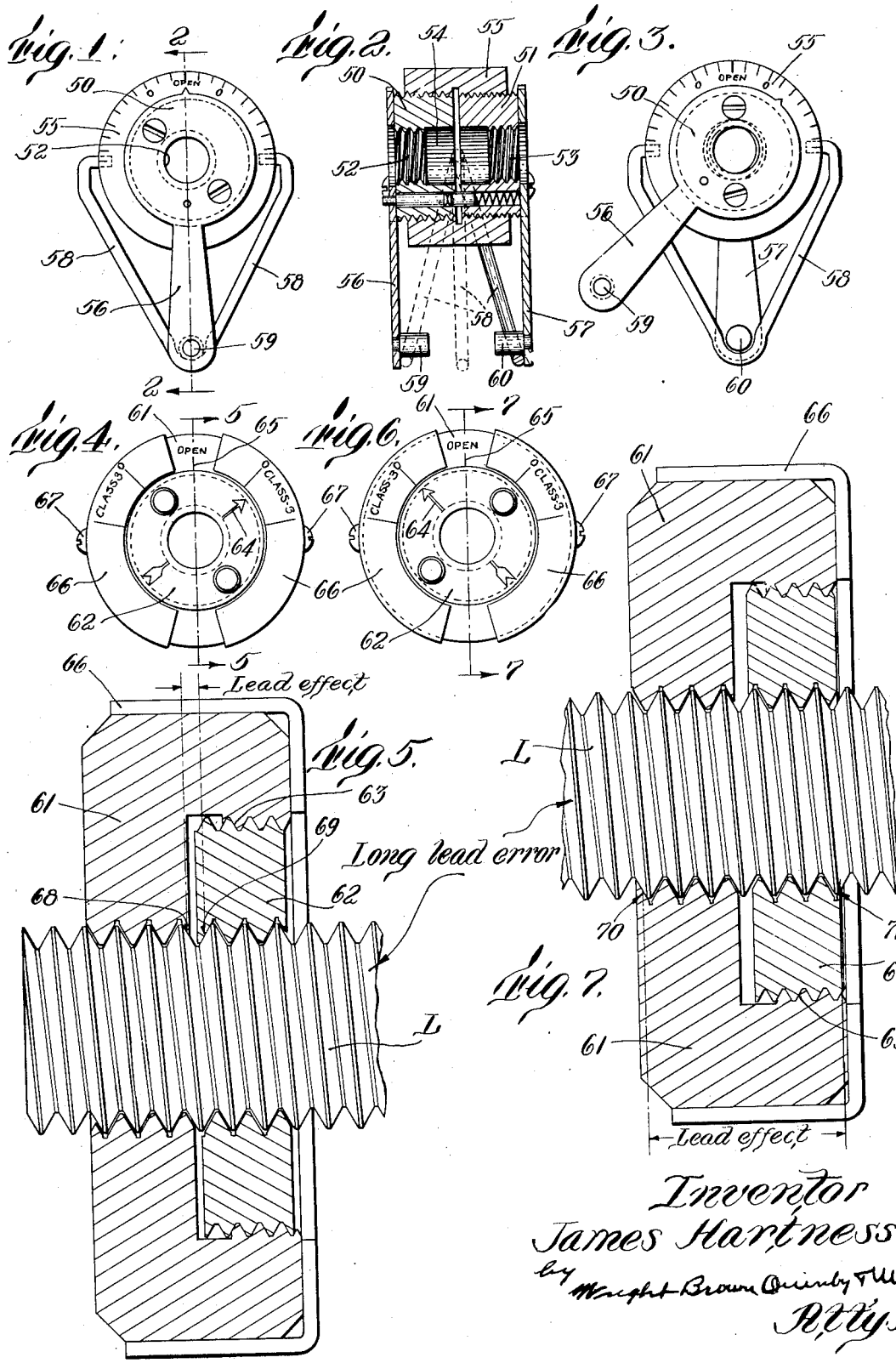

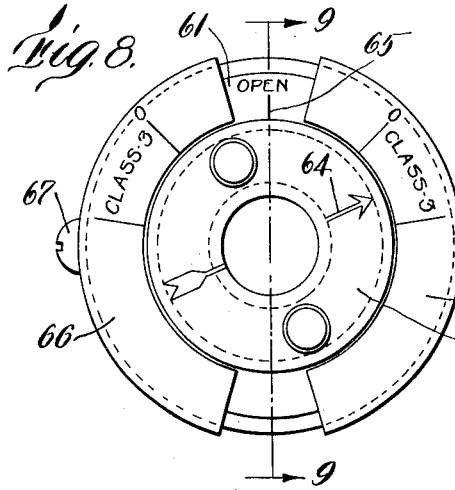
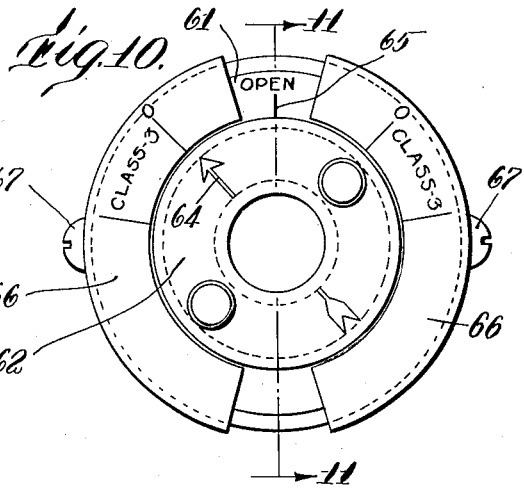
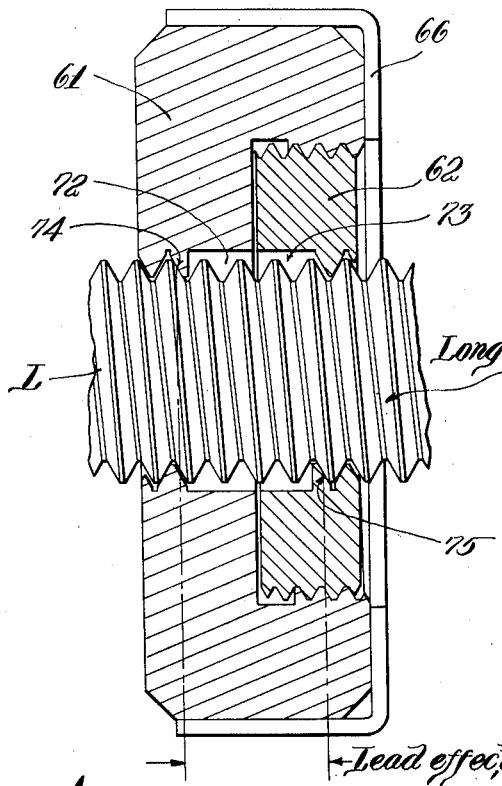
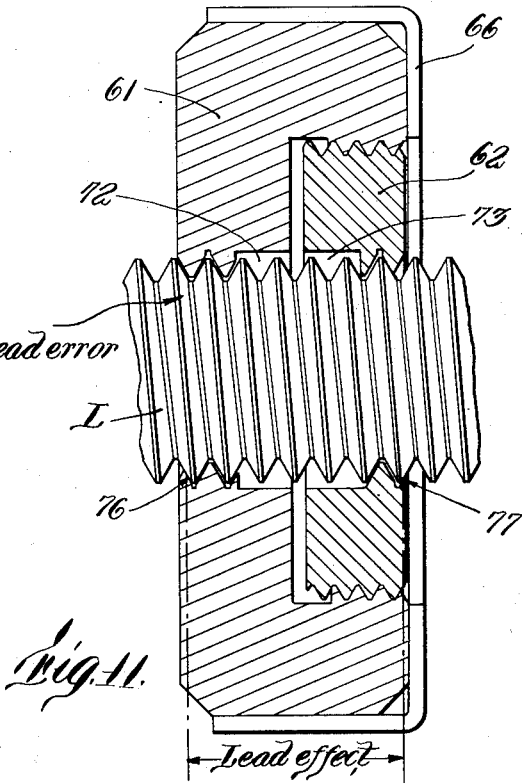

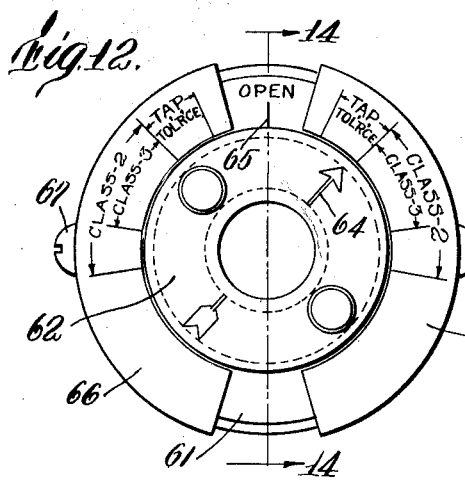
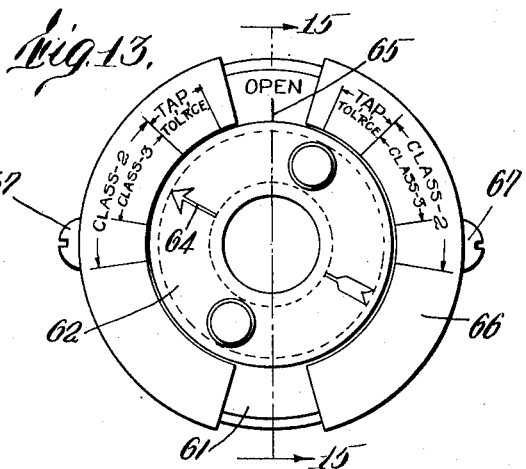
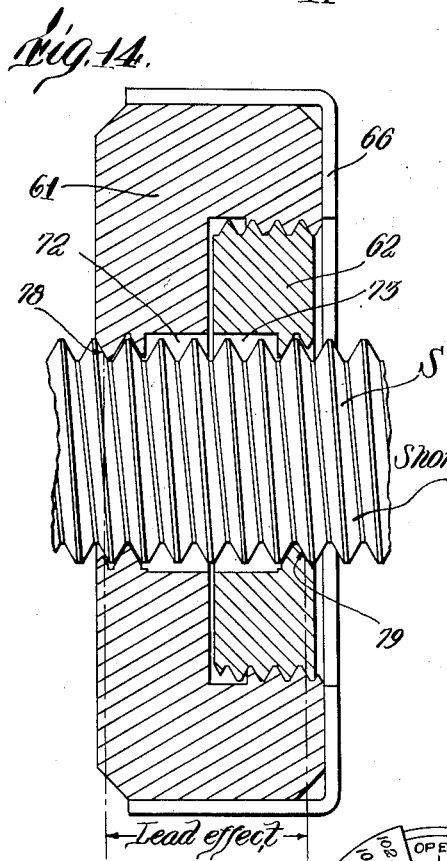
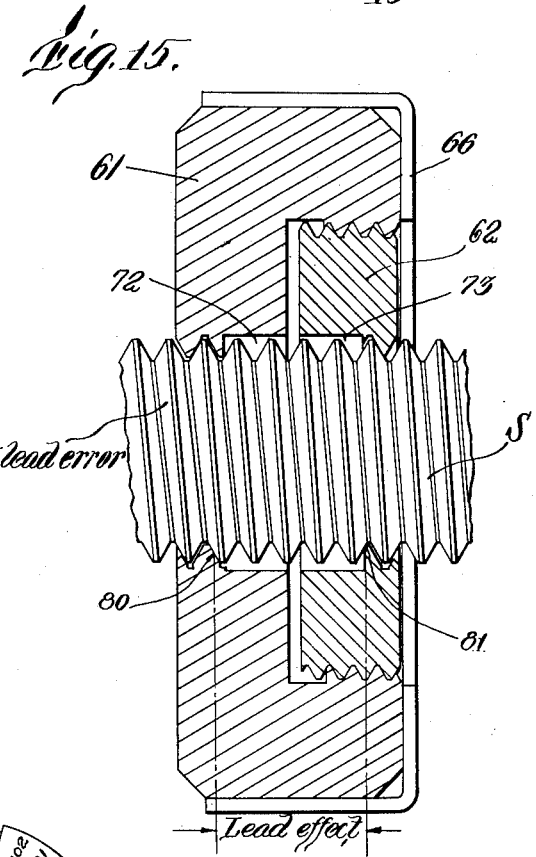
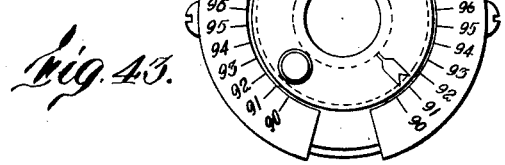

Inventor
James Hartness
by
Wright, Brown, Quinby & May
Attys.

Aug. 15, 1933.      J. HARTNESS      1,922,849
GAUGING OF SCREW THREADS
Filed June 21, 1928      7 Sheets-Sheet 6
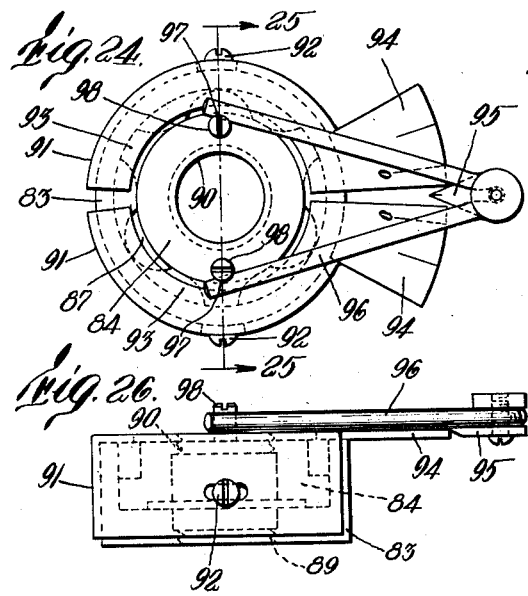
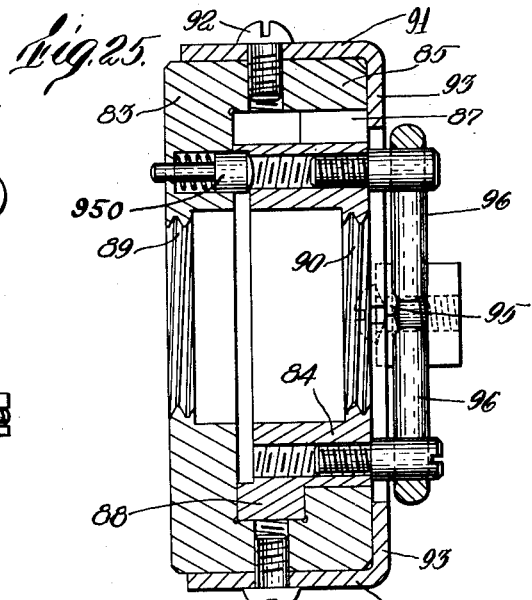
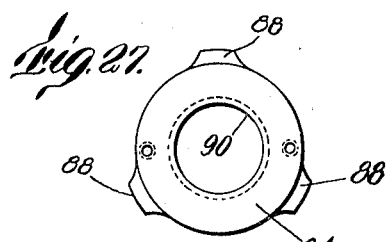
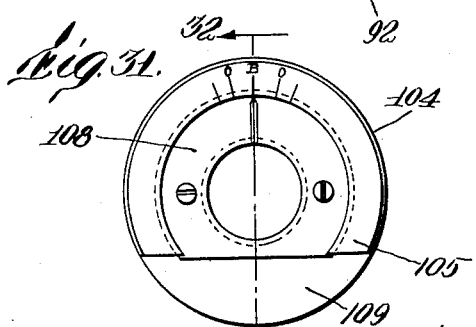
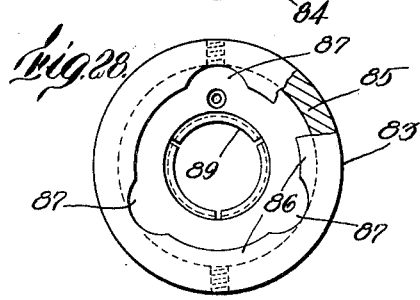
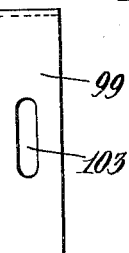
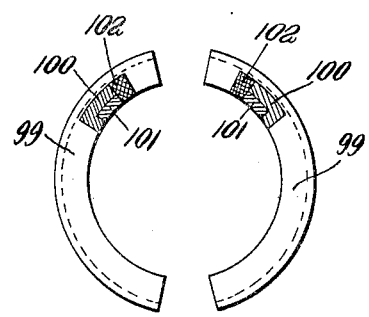
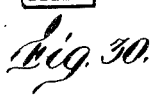
Inventor
James Hartness
by
Wright, Brown, Quinby [illegible]
Attys.

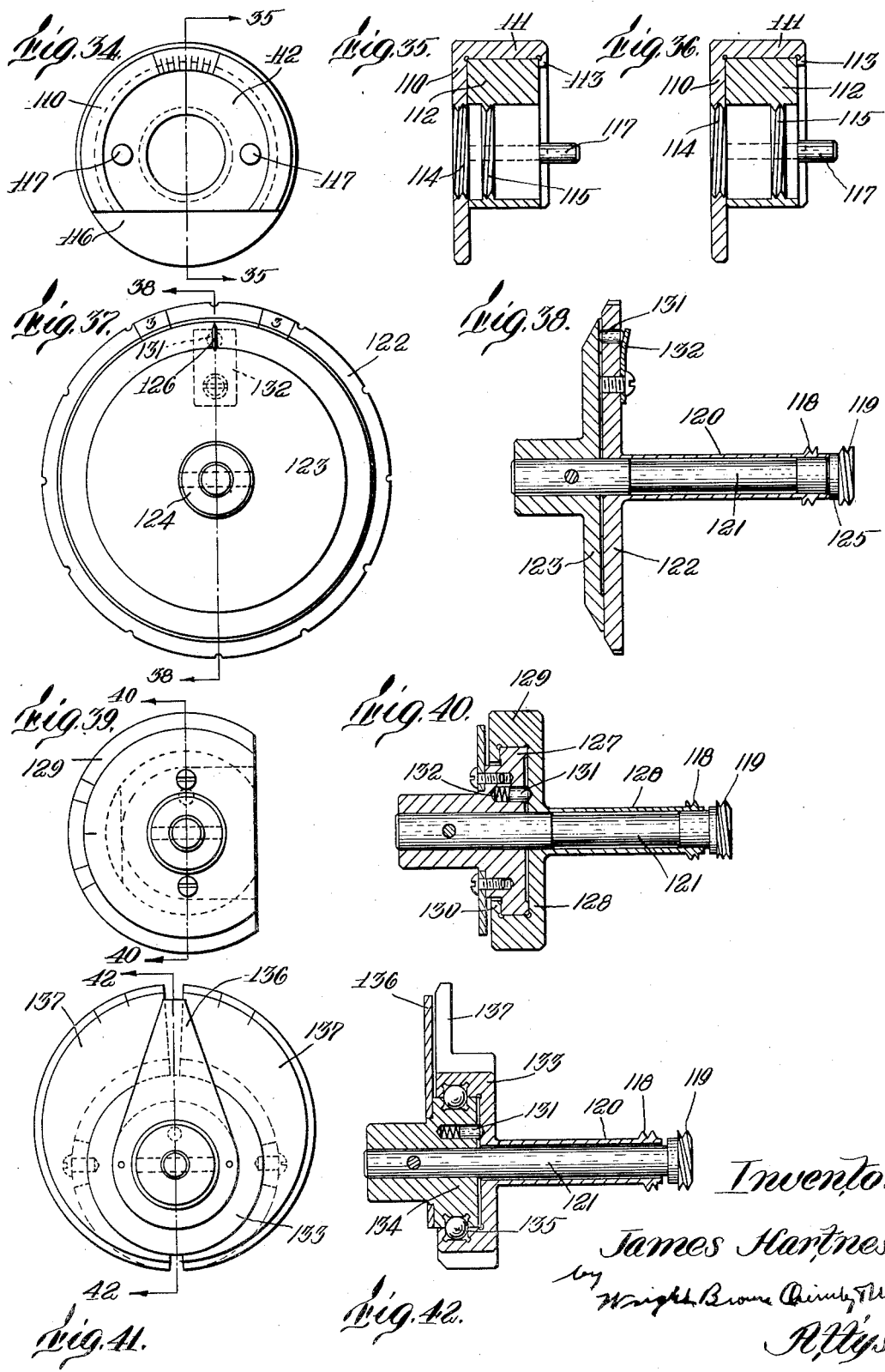
Aug. 15, 1933.   J. HARTNESS   1,922,849
GAUGING OF SCREW THREADS
Filed June 21, 1928   7 Sheets-Sheet 7

Patented Aug. 15, 1933

1,922,849

UNITED STATES PATENT OFFICE 1,922,849

GAUGING OF SCREW THREADS

James Hartness, Springfield, Vt.

Application June 21, 1928. Serial No. 287,137

20 Claims. (Cl. 33—199)

This invention relates to a method of gauging screw threads and to gauges for practicing the method. Owing to the great amount of machinery of all kinds now in use, it is a practical economic necessity that machine parts, especially screw-threaded parts, be standardized so that parts of a given size may be readily interchanged with equally effective fit.

In order to secure such interchangeability of screw thread products, several elements must be taken into account, none of which may be varied beyond predetermined limits for a certain class of fit. Important among these elements are major diameter, pitch diameter, minor diameter, angle of thread and pitch or lead. A variation in any one of these elements of a screw thread from a fixed standard for any size will prevent a perfect fit.

Heretofore the suitability of threaded parts for interchangeability within a given class of fit has been tested by the use of various forms of gauges termed "go" and "not go". If the threaded member will be acceptable by the "go" gauge and unacceptable by the "not go" gauge, it has been passed as sufficiently accurate. This condition, however, does not necessarily signify that each of the various elements, for which there are tolerance limits is actually within such limits, since variation in one may, to a greater or less extent, offset variation in another. For example, an excessively long or short lead in a screw will give an effect of increased pitch diameter in the closeness of engagement of the screw in a standard nut and in some types of "go" gauge.

Another deficiency of the "go" and "not go" gauges is the fact that if the threaded work is accepted by the "go" gauge and refused by the "not go" gauge, there is nothing to indicate how near the work is to being refused by the "go" gauge and accepted by the "not go" gauge; that is, how near its dimensions are to the standard. It is desirable, however, to determine a position between the upper and lower tolerance limits which permits the widest departures therefrom without causing rejection of the work and which, when the thread forming machine is once adjusted to it, will permit the machine to run longest without overrunning the boundaries of tolerance.

The deficiencies referred to have been overcome by an optical gauging apparatus known as a comparator, a form of which is described in my Patent No. 1,377,068. While the comparator is an accurate and efficient instrument for gauging screw threads, it is relatively bulky compared with a hand gauge, and is not easily portable from one screw-cutting machine to another. It is an object of the present invention to provide a compact portable gauge which is simple in structure and operation, which is rugged, and which is to a considerable extent a mechanical analogue of the optical comparator.

According to the present invention, gauging means are provided by which the nearness to the most desirable position within the tolerance range of certain important elements or dimensions may be determined in an expeditious manner, and at the machine by which the threads are being formed, so that the machine operator may be guided as to proper adjustments of the machine to be made from time to time tending to correct the departures in either direction of such elements, or dimensions, from such mid-tolerance positions so that such departures may be maintained at all times within the tolerance limits. More specifically gauges by which departures from pitch diameters and lead from those of standard threads may be indicated will be hereinafter disclosed and claimed.

Snap and ring gauges for outside work and plug gauges for inside work, as heretofore constructed, have been subject to abrasion and wear which makes it necessary to establish tolerance boundaries for such gauges. The gauges of the present invention are opening and closing gauges designed to compare taps, screws and other threaded parts directly with a standard plug gage, eliminating the need of the usual intermediate gauges and loss of size of gauges having more or less fixed adjustments due to wear of use. The fact that these gauges are open and closing gauges prevents wear thereon when the work is inserted or removed and they may be compared frequently with an inspector's gauge or even the standard gauge, if desired, without appreciable wear on those gauges. The plug gauge is the only member of the screw family which can be made with great accuracy and it alone is thus suitable for use as the foundation of all thread measurements including both external and internal threads. The gauges of the present invention, also, close with stress on the threads to be tested thus tending to even out surface inequalities and throughout practically the entire thread circumference and they equalize inequalities in substantially the same manner as when the thread is in service.

In general, each of these gauges comprises a plurality of threaded members engageable with standard threads with a relatively lose fit, and so carried or mounted that their threads are capable of measured relative motions into pressing engagement with the threads of the standard threaded member or with the threads of members to be tested, variations in the extent of such motions, when applied to standard threads and to those to be tested, indicating in amount and direction variations of the threads to be tested from the standard threads. The threads of a pair of gauge members which have been screwed onto or into a threaded article to be tested may be moved into pressing engagement with the flanks of the thread to be tested by relative axial movement of the gauge members, or by relative rotation of the gauge members under certain conditions.

When a threaded member such as a bolt is rotated and at the same time is held against axial movement, the thread of the bolt appears to move axially in one direction or the other although there is no bodily axial movement of any portion of the threaded member. If on the other hand the threaded member is rotated through a fixed nut which it accurately fits the apparent advance of the thread is exactly offset by actual axial advance of the member in the opposite direction, so that the thread itself appears to be axially stationary. It is obvious that if the bodily axial motion of the member be in the same direction as the apparent advance of the thread due to rotation, or if the axial motion of the member be in the opposite direction to such advance but at a different rate (including zero), there will appear to an observer to be a resultant advance by the thread.

When two threaded elements are coaxially arranged and are rotated relatively to each other an apparent relative axial movement of the threads will result unless the members themselves are given relative axial movement just sufficient to offset the apparent relative movement of the threads caused by the relative rotation. Accordingly, if two threaded gauge members of the ring type are screwed on to a bolt, and if the two members are then rotated relatively to each other while their relative axial movement due to such rotation is restricted to a rate (which may include zero) other than that necessary to counteract the apparent relative movement of the threads due to rotation, the threads of the gauge members will have apparent relative motion toward or away from each other and will actually move into engagement respectively with opposite flanks of the bolt thread. Such restriction of the freedom of relative axial movement of the gauge members may be conveniently accomplished by providing a threaded connection between the members, the lead of this thread having any desired value, including zero, other than that of the lead of the gauging thread, so that if one member makes a single revolution relatively to the other, the apparent advance of the gauging thread, determined by its lead, will not be balanced by an equal and opposite actual movement of the member with respect to the other due to the lead of the threaded connection between the two members. It is not necessary for gauging purposes that such restriction be effective for all the relative movement of the members. For example, where a pair of gauge members are mutually restricted as to their freedom of relative axial motion by a threaded connection, the threads of such connection may have a loose or slack fit permitting a certain amount of axial play between the members. The restriction on the relative axial movement imposed by the threaded connection in such case does not operate until there has been sufficient relative rotation of the members to take up such slack. The effect of the slack is thus merely to increase the angles of relative turn of the members required to bring their gaging threads into pressing engagement with the threads of a member to be tested.

In the special case where the rate of relative axial movement of the members due to relative rotation is restricted to zero, there may be slack to be taken up before the restriction becomes effective, as when spaced stops are provided on one member to permit relative axial motion on the part of the other member through a definite distance only.

Relative movement of the threaded members in opposite directions axially to bring the side faces of their threads into contact with opposite side faces of the standard thread gives, by the extent of such relative movement, an indication of the flank thickness of the standard thread, and variations in the extent of such movement required to bring the side faces of the threads of these members into contact with the opposite side faces of the threads to be tested indicate variations in flank thickness of the threads to be tested from those of the standard thread. Flank thickness (i. e., the thickness of a thread from flank to flank measured at the pitch line) is a true measure of the strength of the thread and heretofore has been arrived at indirectly by measurement of pitch diameter which is a definite function only of flank thickness, depending on the angle of the thread faces. With the usual angle of 60°, variations of pitch diameter cause .577 of those amounts in corresponding variations of flank thickness at the pitch line.

As measurement of pitch diameter as heretofore practiced is made at single points only, it may give a local measurement only which may not truly indicate the strength of the thread in service where the bearing of the mating thread thereon is over an extended area. Such measurements are reliable only when made on especially prepared smooth threads and are not suitable for testing the relatively rough surfaced threads produced by the usual thread forming machines. The contact between the threads of the gauge members of the present invention and the threads to be tested is similar to that which the threads to be tested have with their mating threads in service.

Differences in permissible axial movement between the two gauge members when applied to standard threads and threads to be tested represent differences in relative position of the corresponding faces of the threads of the standard and test pieces. If there is no lead error of the test piece the difference between the permissible movement when the gauge is applied to the standard thread and when applied to the test thread is the same whether the gauge pieces are turned in one or the opposite direction relative to each other. If there is a lead error these permissible movements will be unequal for these opposite movements of the gage members, the extent of this inequality indicating the extent of lead error. These gauges thus may indicate lead error as well as flank thickness or pitch diameter error.

According to the present invention, the thread-engaging portions of the gauge members are relatively short so that they each preferably engage only a single turn of the thread to be tested.

The members are also preferably connected in such a way that the turns of thread engaged thereby are spaced by several intermediate turns which are not touched by the gauge members. Thus when the members are relatively rotated as far as possible first in one direction and then in the other, such rotation results in the engagement of the members of opposite flanks of the same two spaced turns of the thread to be tested, so that if there is a lead error in the thread to be tested, this error has substantially equal effects on angles of relative rotation of the members in opposite directions. In other words, a lead error will decrease the relative angle in one direction by substantially the same amount as it will increase the relative angle in the other direction. An error in flank thickness, however, increases or decreases both angles alike according as the flank is thinner or thicker than standard. The actual readings of a gauge embodying the present invention indicate the sum and difference respectively of the flank thickness error of one thread and the lead error over several threads. As will be apparent from embodiments of the invention hereinafter described in detail, if the error of flank thickness of a thread to be tested is at either limit of tolerance, the slightest lead error will result in the rejection of the piece tested. If, however, the flank thickness error is well within both limits of tolerance, a certain amount of lead error will be permitted, this amount depending on the proximity of the flank thickness error to either limit of tolerance. This is closely analogous to comparator practice. As described in my Patent No. 1,377,068, a comparator of the type referred to comprises essentially a chart or screen on which is cast a magnified outline image of a turn of the thread of a screw which may be rigidly supported at a point axially spaced from the turn which is examined. The chart may be provided with marks indicating zones of tolerance which are adjusted to agree with a standard plug gauge inserted in the comparator. If the turn of thread examined varies from standard in size or shape, these variations appear on the chart sufficiently magnified to be capable of easy comparison with the tolerance limit marks. An error of lead in the screw tested results in a lateral displacement of the image on the chart. It is obvious that if the contour size of the thread be well within the tolerance limits, a certain amount of lateral displacement (lead error) is permissible without rejection of the screw. If, however, the image of a thread to be tested is the maximum or minimum tolerated, any lead error will displace the image laterally over one of the tolerance boundaries and thus result in the rejection of the screw under test. Thus the gauge embodying the present invention closely resembles the comparator in its testing action and passes or rejects respectively the same screws which would be passed or rejected by the comparator so far as errors of flank thickness and lead are concerned.

In calibrating gauges embodying the present invention, it is advantageous to use standard threads which are accurately ground so as to have no lead error, one such thread having the maximum tolerated thickness of flank, the other having the minimum for the class of fit selected. Each of these standard threads is brought into engagement with the gauge and the limit of relative rotation of the members of the latter are marked or otherwise indicated on the members, these indications defining tolerance zones for the class of fit represented by the standard threads used for calibration. In order to avoid confusion on the part of the operator using the gauge, it may be desirable to indicate on the gauge zones for but one class of fit. Two or more classes, however, may be indicated on a gauge as by lines marking the several boundaries, areas of different colors for the different class zones, or by other equivalent means. If desired, tap thread tolerance may also be indicated on the gauge members, tap thread tolerance being in general different from tolerances for screw threads of the same size.

In actual practice, the significance or seriousness of a lead error in a screw thread depends to some extent on the axial length of threaded engagement of a screw with a nut or threaded hole. If the length of threaded engagement is relatively short, a degree of lead error might be tolerated which would be out of the question for a longer engagement, since the total lead error accumulates with each turn of the thread. For example, a screw with a certain amount of lead error might fit acceptably in a nut having a quarter-inch height, due to the ability of the metal to "flow" or yield slightly under stress. The same screw might, however, fail to enter all the way into a threaded hole a couple of inches or so deep. It may therefore be desirable from a practical point of view to gauge a thread in a manner related to the service for which it is intended. If the screw is designed for engagement in a threaded hole an inch deep, it is advantageous to gauge the screw thread over about an inch of the screw length. Thus the ability of a screw to meet the particular requirements of the service for which it is intended can be more directly determined than by examining a different length of screw. According to the invention, I provide gauges which can be used alternatively for gauging screws for lead error extending over different lengths of screw.

In general, the relatively movable members composing the chief parts of gauges embodying the present invention are adapted to be gripped directly by the fingers of the operator. Where relatively large screws are thus tested there is little danger of excessive or harmful torque being brought to bear on the gauge members. With finer threads, however, it may be desirable to provide against excessive torque. This may be done by providing a friction or spring connection between the portion of one or both members which engages the thread to be tested and the portion grasped by the operator. To this end, also a handle may be provided for one or both of the members to facilitate relative rotation, such handle being preferably releasably attached to its member so as to let go before excessive torque is applied to the member.

For a more complete disclosure of the invention, reference is had to the description which follows and to the drawings of which,—

Figure 1 represents in elevation a screw thread gauge embodying the invention.

Figure 2 is a section on the line 2—2 of Figure 1.

Figure 3 is an elevation of the gauge shown in Figure 1, one of the parts being in a different position of operation.

Figure 4 is an elevation of a gauge of a somewhat different type.

Figure 5 is a section on the line 5—5 of Figure 4, the section being on a larger scale.

Figure 6 is an elevation of the gauge shown in Figure 4, one of the parts being shown in a different position of operation.

Figure 7 is a section on the line 7—7 of Figure 6, but on a larger scale.

Figure 8 is an elevation of a thread gauge, the members of which have spaced engagement with a screw having a long lead error.

Figure 9 is a section on the line 9—9 of Figure 8.

Figure 10 is an elevation on the gauge shown in Figure 8, one of the parts being in a different position of operation, the parts being in engagement with a screw having a long lead error.

Figure 11 is a section on the line 11—11 of Figure 10.

Figures 12 and 13 are elevations of the gauge shown in Figure 8, these figures illustrating the gauge when in engagement with a screw having a short lead error.

Figures 14 and 15 are sections respectively on the lines 14—14 and 15—15 of Figures 12 and 13.

Figures 16 and 17 are elevations of a gauge somewhat similar to that shown in Figure 8, but having a different arrangement of threads for engaging work to be tested, the gauge being shown in these figures in engagement with a screw having long lead error.

Figures 18 and 19 are sections respectively on the lines 18—18 of Figure 16 and 19—19 of Figure 17.

Figure 20:
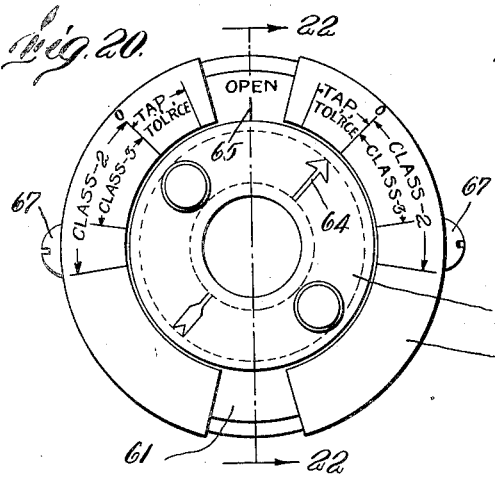
Figure 21:
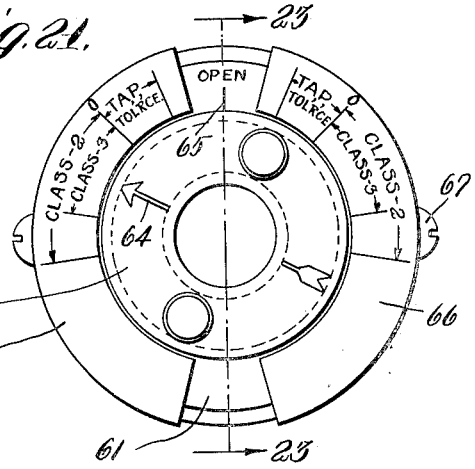

Figures 20 and 21 are elevations of the gauge illustrated in Figure 16, showing operative positions of the members when in engagement with a screw having short lead error.

Figure 22:
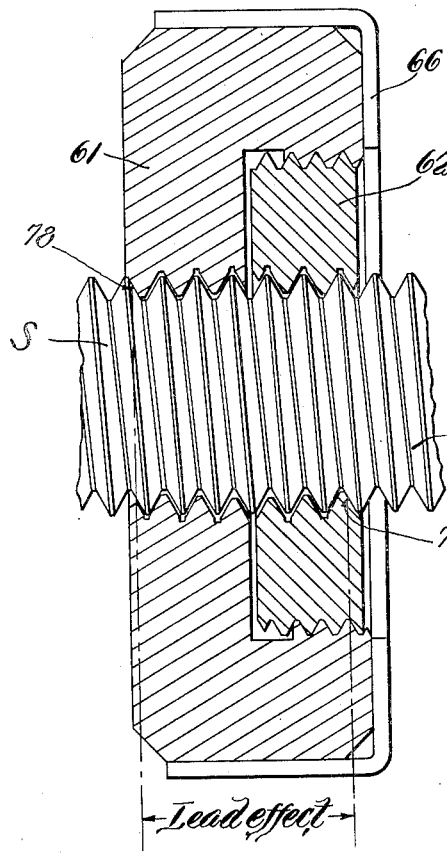
Figure 23:
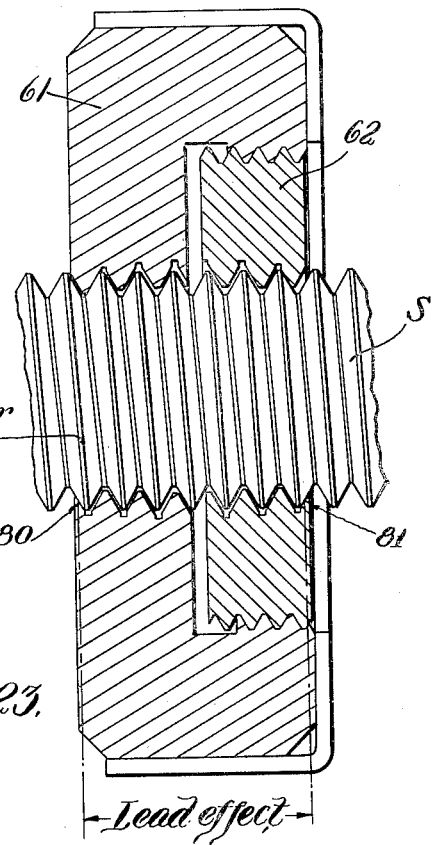

Figures 22 and 23 are sections respectively on the lines 22—22 of Figure 20 and 23—23 of Figure 21.

Figure 24 is an elevation of a modified form of gauge embodying the invention.

Figure 25 is a section on the line 25—25 of Figure 24, the section being shown on a larger scale.

Figure 26 is a side elevation of the gauge shown in Figure 24.

Figures 27 and 28 are elevations of the two gauging members which are included in the gauge shown in Figure 24.

Figure 29 is an elevation of a pair of casing members of modified form which can be used on the gauge illustrated in Figure 24.

Figure 30 is a side elevation of one of the casing members shown in Figure 29.

Figure 31 is an elevation in modified form of gauge embodying the invention.

Figure 32 is a section on the line 32—32 of Figure 31.

Figure 33 is a section similar to Figure 32 but showing one of the gauge members in a different position relative to the other.

Figure 34 is an elevation of another modified form of the invention.

Figure 35 is a section on the line 35—35 of Figure 34.

Figure 36 is a section similar to Figure 35, but showing one of the gauge members in reversed position.

Figure 37 is an end elevation of a plug gauge embodying the invention.

Figure 38 is a section on the line 38—38 of Figure 37.

Figure 39 is an end elevation of a modified form of plug gauge embodying the invention.

Figure 40 is a section on the line 40—40 of Figure 39.

Figure 41 is an end elevation of another modified form of plug gauge.

Figure 42 is a section on the line 42—42 of Figure 41.

Figure 43 (sheet 3) is an elevation of a thread gauge calibrated in terms of percentage of flank thickness or of pitch diameter.

Referring to the drawings in detail, Figures 1—3 represent a thread gauge characterized by a pair of threaded gauge members 50, 51 which are provided with internal thread portions 52, 53, respectively, adapted for threaded engagement with a screw thread to be tested. The thread portions 52, 53 are according to the invention spaced axially by substantial portions of the members 50, 51 which clear the thread of the screw to be tested as by being cut away at 54. In order to control the relative motion of the members 50, 51, they may be screw-threaded into a collar 55. As shown in Figure 2, the member 50 is threaded into the collar 55 by a thread having the same lead as the thread 52 of the member. The thread 52, however, is eccentric to the external periphery of the member 50 which is threaded into the collar 55. The member 51 is threaded into the collar 55 with a thread having a lead different from the thread 53, the lead being preferably shorter than that of the thread 53. The bore of the thread 53, however, is preferably concentric with the peripheral threaded surface of the member 51 for purposes to be hereinafter described. The members 50 and 51 are preferably so threaded that when held in the position shown in Figures 1 and 2, the threads 52, 53 will lie in a common helix. These threads are preferably cut of such a size as to receive in loose fitting engagement the maximum screw thread to be tested within the tolerance limit. In order to facilitate operation of the members 50 and 51, these members may be provided respectively with radially extending handles 56, 57. These handles are preferably so related to the members 50, 51 that when in line as shown in Figures 1 and 2, the threads 52, 53 lie in a common helix. After a screw to be tested is screwed into engagement with the threads 52, 53, it may be tested in one of two ways. If the member 50 is rotated on the screw to be tested while the member 51 is held in fixed relation to the screw and to the collar 55, the eccentric position of the thread 52 will cause the bore of this thread to move transversely to the axis of the screw and will result in a binding engagement of the thread 52 with the thread of the screw to be tested. The extent of such rotation of the member 50 may be indicated by an index on the periphery of the member 50 cooperating with suitable scale marks or tolerance zone indications on the collar 55 as illustrated in Figures 1 and 3. Since the external and internal threads of the member 50 are of the same pitch, the engagement of the member 50 with the screw to be tested will be due to the transverse motion of the member 50 and not to an apparent advance of the thread 52. If preferred, the member 50 may be held in fixed relation to the screw to be tested and the collar 55 while the member 51 is rotated first in one direction as far as possible and then in the opposite direction. Due to the short lead of the external thread of the member 51, rotation of this member will result in an apparent advance of the thread 53 in one direction or the other, depending on the direction of rotation of the member 51. Since the screw to be tested is meanwhile held in engagement with the thread 52, the apparent motion of the thread 53 will bring it into binding engagement with the thread to be tested. It is obvious that the less the flank thickness or pitch diameter of the screw to be tested, the greater the rotation required to take up the slack between the thread to be tested and the thread 53. Hence the greater the required rotation of the member 51. It will also be apparent that if there is lead error in the screw, one of the throws of the member 51 will be shortened since the effect of lead error is to either increase or decrease the axial distance between a turn of thread engaged with the member 50 and a spaced turn of thread engaged with the member 51 so that the throw of the member 51 will be decreased in one direction and increased in the other. In order to facilitate the facing of one of the members 50, 51 with respect to the collar 55 while the other member is being rotated, a suitable stirrup 58 may be provided having its ends projecting into suitable apertures in opposite sides of the collar 55 and having an intermediate portion adapted to engage alternatively a stud 59 on the handle 56 or a similar stud 60 on the handle 57. As shown in Figure 2, the stirrup 58 may be swung to one side or the other to engage the handle selected, leaving the other handle free for operation.

Figures 4 to 6 illustrate a screw gauge having two gauge members 61, 62 which are internally threaded and are connected together in threaded engagement as at 63 to permit control of relative axial motion. The internal threads of the members 61, 62 are arranged so as to be capable of forming a practically continuous helix extending from the outer face of the member 61 to the opposite outer face of the member 62. For convenience of operation, an index 64 may be supplied on the member 62, which index is adapted to cooperate with a mark 65 on the member 61 to indicate the relative positions of the members 61, 62 in which their internal threads lie in a common helix, this relative position being conveniently known as the "open" position. The internal thread of these members is preferably large enough to receive in loosely fitted engagement a screw having the largest dimensions within the limits of tolerance for the size to be tested and for the class of fit desired. It is apparent from Figure 5 that relative motion between the members 61 and 62 will result in a relative advance of the inner threads of these members, the direction of advance depending on the direction of relative rotation. Thus rotation of the member 62 toward the right, as indicated in Figure 4, will result in the inner thread of this member engaging the left hand flank of the thread of the screw to be tested, as shown in Figure 5, pulling the screw bodily toward the right until the right hand flank of its thread comes into binding engagement with the inner thread of the member 61. If the screw has no lead error, each of the turns of the inner threads of members 61, 62 will engage equally one flank or the other of the thread on the screw to be tested. In case there is slack or looseness in the connecting threads 63 so as to permit axial play between the members 61 and 62, the angles of relative rotation of these members required to bring their gauging threads into binding engagement with the thread of the screw will both be larger since a certain amount of relative rotation is required to take up such slack before the thread 63 becomes effective in controlling or limiting the relative movements of the gauge members.

By inserting a master plug gauge having an accurately ground correct standard thread, the gauge may be set up on this plug to indicate the amount of relative rotation required between the members 61 and 62 to take up the slack between their internal threads and the thread of the plug gauge. The position of the index 64 in such case may be indicated as by a suitable zero mark as shown in Figure 4 which may be made directly on a portion of the member 61 or may be made on a suitable collar 66, a pair of which may be adjustably secured to the periphery of the member 61 as by a pair of screws 67 passing through suitable slots in the collars 66. It is obvious that with a master plug gauge having no lead error inserted in the gauge, the zero lines on either side of the "open" mark will be equally distant therefrom since the amount of slack between the gauge and the screw thread to be taken up will be the same in both directions. If the master plug gauge is now removed and replaced by another plug gauge having no lead error, but having a flank thickness or pitch diameter at the lower limit of tolerance for the class of fit desired, when such a plug gauge is inserted in the gauge, the member 62 may be turned through greater angles from the "open" position mark. These angles of rotation will be equal to each other and may be indicated by suitable lines on the collars 66 to cooperate with the zero mark in defining zones of tolerance within which the index 64 must register when the gauge is on a screw to be tested if the screw is to be accepted. If lead error is present in the screw to be tested, the angles of rotation of the member 62 in opposite directions from the "open" position will not be symmetrical. This effect is illustrated in Figures 4—7 wherein the operative positions of the member 62 relative to the member 61 when the gauge is in engagement with a screw thread having a long lead. Referring to Figure 5, it is apparent that if the lead of the screw L to be tested is long, when the members 61, 62 are set up tightly on the screw L by turning the member 62 to the right as in Figure 4, the inner turns only of the members 61 and 62 will engage the flanks of the thread of the screw L as at points 68 and 69 respectively. The effect of the long lead error on the screw will result in other turns of the screw thread being progressively spaced outwardly from the turns of the gauge threads. Since the effect of the lead error on the screw L between the points 68 and 69 is negligible in the case of ordinary lead error, the angular position of the index 64 in such case is a substantially correct indication of the flank thickness or pitch diameter of the screw L. When, as in Figures 6 and 7, the member 62 is rotated to the left, the points of engagement of the screw L with the members 61 and 62 are at 70 and 71 respectively, since when the member 62 is turned to the left it engages the right hand flank of the screw L as in Figure 7, while the member 61 engages the left hand flank as at 70. Thus the outermost turns of each of the members 61, 62 comes into binding engagement with the thread L, the inner turns being increasingly spaced therefrom due to the lead error. Since the axial distance between the points of contact 70 and 71 is greater in the screw having a long lead error than it would be in a screw having no lead error, there will not be so much slack to be taken up when the member 62 is turned to the left. Hence the members 61, 62 will come into binding engagement with the screw L with a shorter angular turning of the member 62, as indicated in Figure 6. The effect of the lead error is thus indicated over a number of turns substantially equivalent to the turns of the screw L between the opposite outer faces of the members 61, 62. The unsymmetrical positions of the index 64 in its opposite angles of rotation from the open position as shown in Figures 4 and 6 in this manner indicate the presence of lead error in the screw to be tested, the longer angle of throw indicating approximately the flank thickness or pitch diameter of the screw, the shorter throw indicating approximately the magnitude of the lead error. It is apparent that in the case of a screw having a short lead, the throws will likewise be unsymmetrical, but in such case the longer throw of the index 64 will be toward the left, the shorter throw being to the right.

Figures 8–15 inclusive illustrate a screw gauge similar to that shown in Figures 4–7 except that the inner threads of the members 61, 62 are cut away as at 72, 73 so that the inner thread on each of the members 61, 62 has a length of only a turn or a turn and a half to engage the thread of the screw to be tested, these short thread portions being separated by a distance substantially equal to that between the outer opposite faces of the members 61, 62. Figures 8–11 inclusive illustrate this type of gauge in engagement with a screw L having a long lead. Figures 12–15 inclusive illustrate the gauge in engagement with a screw S having a short lead. It is obvious that if a screw to be tested has no lead error, the throws of the index 64 in opposite directions from the "open" position will be symmetrical. If a screw L having a long lead error is inserted in the gauge, and the member 62 is turned toward the right, the inner threads of the members 61, 62 will engage respectively the right and left hand flanks of the thread L as at points 74, 75, that is, on the turns of the threads of the members 61 and 62 which are nearest to each other. Since, however, there is preferably not over a turn and a half of thread within the members 61, 62, and the points of engagement are spaced by the cutouts 72, 73, the effect of the lead error of the screw L will be extended over a considerable axial length of the screw and will be substantially equal and opposite to the effect of the lead error on the opposite throw of the member 62 which is illustrated in Figures 10 and 11. In other words, if a screw with no lead error is inserted in the gauge, the opposite angles of rotation from the open position will be equal; but if a screw with a lead error is introduced, one of the angles of rotation will be increased by approximately the same amount that the opposite angle is decreased. If there is also present an error of flank thickness or pitch diameter, an excess of flank thickness over normal will shorten both throws of the member 62 by an equal angle, and a flank thickness less than normal will increase both angles of throw of the member 62 by an equal amount. Hence the mean of the opposite angles of throw of the member 62 will be a substantially correct indication of the flank thickness or pitch diameter error of the screw thread L. It is to be observed that the form of gauge shown in Figures 8–11 is more selective in its action than the form shown in Figures 4–7. In other words, the former will cause rejection of certain screws which would appear acceptable when gauged by the latter. This difference arises from the fact that in certain types of gauges, the effect of a flank thickness which is less than normal may be offset to some extent by a lead error since lead error has the effect on certain types of gauges of thickness of flank due to the fact that the threads of the gauge cannot enter as far into the thread of a screw to be tested which has either a flank thickness greater than normal or a lead error, as it can into the thread of a perfect screw. For this reason, where a gauge is used which depends solely for its action on the distance to which the thread of the gauge will enter the thread of the screw to be tested, there is nothing to tell whether a reading of the gauge indicates excessive flank thickness or the presence of lead error. If therefore there is a small lead error combined with a flank thickness less than normal, these two errors may offset each other when a screw is tested by a gauge of the ring type so that the screw appears to be satisfactory when it actually is not. In the type of gauge illustrated in Figures 4–7, it is obvious that the effect of any lead error is to shorten the throw of the member 62 in one direction or the other, according as the lead error is long or short. If the screw to be tested has a long lead error as illustrated, the left hand throw of the member 62 will be shortened as hereinbefore explained, the right hand throw being affected to a negligible degree. If the flanks of the screw thread are of normal thickness, such a lead error will cause the index 64 on the left hand throw to fall short of the zero mark on that side so that the index will fall outside of that zone of tolerance and will result in the rejection of the screw. If, however, the flank thickness is less than normal, the throw in both directions will be increased and the flank thickness error may be of such a size that the throw to the left will fall within the tolerance zone, while at the same time the increase of the throw to the right will not be so great as to allow the index to move beyond the further zone limit. Taking as a specific example, the case of a screw which has the minimum tolerated flank thickness and no lead error, in such case the index 64 would be movable to the right and left up to the further limiting lines of the tolerance zones. If now a screw is tested which also has a minimum tolerated flank thickness, but in addition has a small lead error, the lead error will shorten one of the throws without materially affecting the other so that such a screw would be passed as acceptable by this gauge. If, however, the last mentioned screw with minimum flank thickness and a lead error were tested on a gauge such as that illustrated in Figures 8–11, the shortening effect on the throw in one direction would be accompanied by a lengthening effect on the throw in the opposite direction, so that the latter throw would thus lie beyond the tolerance limit and the screw would be rejected. Thus when a gauge of this type is used, in order for a screw to pass as acceptable, it must have no lead error if the flanks are of minimum tolerated thickness. If, however, the flank thickness is well within the limits of tolerance, but are slightly undersize, a certain amount of lead error will be tolerated, depending on the amount by which the flank thickness of the thread exceeds the minimum tolerated limit.

Figures 12–15 are similar to Figures 8–11 except that they show the action of the same type of thread gauge when used on a thread screw S having short lead error. As shown in Figures 12–14, rotation of the member 62 toward the right results in engagement of the screw threads of the members 61, 62 with the right and left hand faces respectively of the screw thread S at points 78 and 79. If the flank thickness in such a case is normal or only slightly under normal, the lead error may cause the index 64 to fall short of the tolerance zone as shown in Figure 12, causing the screw to be rejected. On the left hand throw illustrated in Figures 13 and 15, the contact of the members 61 and 62 with the screw S is at points 80, 81, respectively. Comparing Figures 8 and 10 with Figures 12 and 13, it is apparent that the presence of long lead in a screw being tested is evidenced by a throw to the left which is shorter than a throw to the right, whereas the presence of short lead error is evidenced by a throw to the right which is shorter than the throw to the left. In either case, the mean between the throws indicates the flank thickness of the screw compared with the standard flank thickness. It is important that these two sources of error be independently noted so as to enable an operator to adjust his thread-cutting machine in such a way as to overcome the particular type of error which is predominant.

Figures 16–23 inclusive illustrate a gauge which is similar to that shown in Figures 8–15 and which operates in identically the same manner. The clearance of the intermediate threads within the members 61 and 62 in this type of gauge, however, is obtained by taper-threading the members in opposite directions, the taper being sufficiently great to insure clearance between the intermediate turns of the threads on the members 61 and 62 and the opposing turns of the thread on the screw to be tested. Figures 16–19 inclusive illustrate the operation of a gauge of this type on a screw thread having long lead, Figures 20–23 showing the gauge used with a screw having a short lead error.

In the embodiments of the invention hereinbefore described, the two gauging members have been illustrated as mutually connected by means of a thread having a lead different from and preferably less than the pitch of the interior thread which engages the screw to be tested. Such a construction results in a differential effect between the screw-engaging threads and the connecting thread which results in a slower apparent motion of the screw-engaging thread against the flank of the screw to be tested. This has the effect of magnifying the arc of tolerance as indicated on one or the other of the gauging members. I may, however, dispense with the thread which connects the two members and provide in lieu thereof, means for setting definite limits to the axial movement of one of the gauging members relative to the other. A gauge of this type is illustrated in Figures 24—28, this gauge comprising a pair of gauging members 83 and 84 which are illustrated individually in Figures 28 and 27 respectively. The member 83 may be provided with an axially extending flange portion 85 having an inturned lip 86 which may be cut away at spaced points as at 87 to permit the introduction of lugs 88 extending outwardly from the periphery of the member 84, this member being of a size to fit closely within the flange portion 85 of the member 83. The members 83 and 84 are provided respectively with internal thread portions 89 and 90 which as shown in Figure 25 are relatively short in the direction of the axis of opening, so that each thread 89 and 90 engages a screw to be tested on but a single turn or a turn and a half. These threads are also axially spaced from each other as far as the thickness of the gauge as a whole will permit in order to magnify as far as possible the effect of any lead error which may be present in a screw to be tested. In order to indicate the angles of throw of the member 84 within the member 83, a pair of collars 91 may be adjustably secured to the periphery of the member 83 as by suitable set screws 92 extending through slotted openings in the collars 91. The collars 91 are preferably provided with inturned lips 93 on which tolerance zone limiting marks may be inscribed. In order to magnify the extent of the tolerance zones to facilitate the reading of the index, the collars 91 may be each provided with a radially extending sector portion 94. In order to cooperate with these outwardly extending sectors 94, I may provide a suitable index 95 carried by a spring stirrup 96 having a pair of legs with notches 97 adapted to fit against the side of suitable pins 98 which are set into the face of the member 84. The stirrup 96 not only serves as a support for the index 95, but also as a convenient handle whereby the member 84 may be rotated in one direction or the other with respect to the member 83. The yielding engagement of the stirrup 96 with the pins 98 acts as a safety device to prevent undue stresses being placed on the gauge or upon the thread to be gauged. If an operator tends to turn the member 84 too strongly, it is obvious that the stirrup 96 will snap out of engagement with the pins 98 and thus prevent injury to the gauge. In operating a gauge of this type, the index 95 is yieldingly held opposite the "open" position mark as by a spring-pressed plunger 950 mounted in the member 83 to engage the member 84, this position insuring that the threads on the portions 89, 90 lie in a common helix. A screw to be tested may then be screwed into thread-engaging relation with the gauge members. If the member 84 is now rotated relatively to the member 83, these members being held against relative axial motion, the rotation of the member 84 will cause an apparent advance of its inner thread in one direction or the other, this advance resulting in the thread of the member 84 bringing up tightly against one of the flanks of the screw thread to be tested and moving the screw itself axially until the flank of its thread is brought up tightly against the inner thread of the member 83. The amount of slack in the engagement between the thread of the screw to be tested and the threads 89 and 90 will determine the possible angle of rotation of the member 84 with respect to the member 83 in both directions when in engagement with the screw to be tested. It is not necessary, though it is desirable, that the member 84 be held against any axial movement relative to the member 83. Any amount of axial play between these two members may be permitted provided that a definite limit be established to their relative axial movement in either direction. The presence of play between the two would result in a greater amount of rotation of one relative to the other when in engagement with a screw to be tested due to the fact that the play between the two members would have to be taken up by such motion in addition to the slack between the threads of the gauging members and the thread of the screw.

The collars 66 or 91 which have been hereinbefore described may be marked to indicate a single zone of tolerance on either side of the "open" position. If a different class of fit is desired for another lot of screws to be tested, these collars may be replaced by similar collars having different zones of tolerance indicated thereon in accordance with the different class of fit desired. These collars may be accurately adjusted by introducing a standard plug gauge into threaded engagement with the thread gauge and setting up on the gauge in both directions. The zero mark on each collar should be adjusted to register with the index 64 or 95 when the gauge is thus set up snugly on the master plug. It may be desired to have a gauge which is suitable for more than one class of fit. Such a gauge may be had by the use of collars 99 as illustrated in Figures 29 and 30. As shown herein, two tolerance zones for screws and a tolerance zone for taps are indicated on each collar. These various zones may be distinguished from one another by the use of different shadings or different colors or the like. For example, the area 100 on each collar may represent a tolerance zone for a class 2, or free fit, as defined in the report of the National Screw Thread Commission and published by the U. S. Bureau of Standards in 1925. The area 101 on each collar may likewise represent zones of tolerance for a class 3, or medium fit. Since the tolerance for taps is in a direction opposite to the usual tolerance for screw threads, the areas 102 may represent zones of tap tolerance. Thus without any change of parts, a thread gauge may be utilized for testing screws or taps for various classes of fit. In Figure 30 is illustrated also a slot 103 by which the collars hereinbefore mentioned can be adjusted so as to set the zero points in their correct positions.

Figures 31—33 illustrate a modified form of thread gauge which is particularly useful for measuring different screws which are intended for different purposes. If a screw is intended for use with a nut which is comparatively thin, it is obvious that a small lead error is relatively immaterial. If, however, the same screw is intended for use in a deep threaded hole, then the importance of lead error in the screw thread becomes considerably greater and a lead error which could be tolerated in a thin nut might make it impossible for the screw to enter all the way into a deep threaded hole. Hence it is advantageous to be able to gauge the lead error of a screw thread over an axial distance approximately equal to the length of threaded engagement which the screw will have when in use with a nut or threaded hole. In order to provide a gauge which will be capable of testing screws over different axial distances, I may provide a gauge having two members, the threaded portions of which are adjustable to and from each other. To this end, as shown in Figures 31—33, one of the gauge members 104 may comprise a radially extending flange 105 provided with two or more annular recesses adapted to receive selectively the other gauge member 108. As shown in Figures 32 and 33, two such annular recesses 106, 107 are provided, but if desired a greater number may be formed in the flange 105, the latter having as great an axial length as desired. Figure 32 illustrates the gauge with the member 108 seated in the recess 107. Figure 33 illustrates the member 108 seated in the recess 106. It is apparent from these two figures that the axial distance over which the screw to be tested may be gauged can be readily altered by changing the member 108 from one recess to the other. In order to hold the member 108 in position, a segment of the member 104 may be partially cut away as at 109, a segment of the member 108 likewise being cut off. By rotating the member 108 through an angle of 90° from the position shown in Figure 31, it is obvious that its shortened diameter will pass through the aperture between the cut off ends of the flange 105. After the member 108 has entered into one of the recesses 106 or 107, rotation of the member to the position shown in Figure 31 will maintain the member within its recess. Zones of tolerance or other scale markings may be indicated on the end face of flange 105 as illustrated in Figure 31, or adjustable collars such as hereinbefore described may be mounted on the flange.

Figures 34–36 inclusive illustrate a slightly different gauge which is capable of measuring lead error over definite distances. In this form, the gauge may consist of a member 110 having an axially extending flange 111 in which fits a second member 112. The flange 111 may be provided with an inwardly extending lip 113 which engages a face of the member 112 and holds it against a face of the member 110. As shown in Figures 35 and 36, no axial play between the members 110 and 112 is permitted, but as hereinbefore mentioned, such play may be permitted if desired, providing the opposing faces of the member 110 and its lip 113 set definite limits to the axial movement of the member 112 with respect to the member 110. The internal threads 114 and 115 of the gauge members 110 and 112 are preferably narrow and the axial dimension of the member 112 is in this form of gauge relatively large compared with that of the threads 114 or 115. By locating the thread 115 axially spaced from the mid-point of the member 112, as indicated in Figures 35 and 36, reversal of the member 112 within the flange 111 will result in a different spacing of the thread 115 from the thread 114, so that with the parts arranged as shown in Figure 35, the lead error of a thread is tested over a shorter axial distance than with the parts arranged as shown in Figure 36. A segment of the flange 111 and of the member 112 may be cut away as at 116 to permit the insertion of the member 112 within the flange 111 by first turning it through an angle of 90° from the position illustrated in Figure 34. Suitable pins 117 may be mounted on the member 112 to facilitate the rotation of this member when in use and a stirrup or handle 96 such as is illustrated in Figure 24 may also be used with this type of gauge and with the gauge shown in Figure 31.

A gauge for testing internal threads for lead error and flank thickness is illustrated in Figures 37 and 38, this gauge comprising a pair of threaded members 118 and 119, the threads of which are spaced axially as shown in Figure 38. These threaded members are connected by a tube 120 and an axle 121 respectively to a pair of disks 122 and 123. As shown, the disk 122 may be of slightly larger diameter than the disk 123, the latter being provided with a suitable boss 124 which may be grasped by the fingers of the operator to turn the threaded element 119 relatively to the threaded element 118. The engagement of the disk 123 against the disk 122 prevents relative axial movement in one direction between the threaded elements 118 and 119, while a shoulder 125 on the element 119 prevents relative motion between it and the element 118 in the opposite direction. Relative rotation between these two elements, however, results in a relative apparent advance of their threads toward or away from each other, according to the direction of rotation so that when the elements 118 and 119 are inserted into a nut or other internally threaded object to be tested, relative rotation of these elements will cause their threads to come into binding engagement with the flanks of the interior thread being tested. The amount of such rotation may be indicated by means of an index on one of the disks cooperating with suitable scale marks or zone tolerance limit marks on the other disk. As shown in Figures 37 and 38, an index 126 is formed or marked at the rim of the disk 123, tolerance zone limits being indicated at the rim of the disk 122 in such a position as to cooperate readily with the index 126.

Figures 39 and 40 illustrate a slightly modified form of gauge for interior screw threads, in this form the threaded elements 118 and 119 being held against relative axial movement by a disk 127 which fits into a concentric disk 128 and is held in interfacial contact therewith as by a flange 129 with a lip 130 extending around the rim of the disk 127. As shown, the disk 127 is connected rigidly with the threaded element 119, the disk 128 being connected with the element 118. The operation of this form of gauge is identical with that shown in Figures 37 and 38. In order to hold the two disks in the "open" position so as to facilitate the insertion of the elements 118, 119 into a threaded hole to be tested, a yielding catch may be provided. This may consist of a slidable pin 131 carried by one of the disks, a rounded end of the pin 131 being pressed into a shallow recess in the opposing face of the other disk as by a spring 132.

Figures 41 and 42 illustrate another modified form of gage, this form comprising threaded elements 118 and 119 which are held against relative axial motion as by disks 133 and 134, these disks being recessed to provide a ball race for ball bearings 135 which lock the disks against relative axial movement, but permit easy relative rotation. The ball bearings may be introduced into the raceway through an aperture (not shown) in the rim of the disk 133. In order to facilitate the reading of angles of rotation, an index arm 136 may be mounted on the disk 134 and arcuate members 137 may be adjustably attached to the rim of the disk 133, these members having scale marks or tolerance zone limit marks thereon to cooperate with the index arm 136. The disks may be held in their "open" position as by a spring-pressed pin 131. The operation of this gauge is identical with that of gauges shown in Figures 37-40. The calibration of the scales on the gauges which have been hereinbefore described may be in thousandths of an inch or in fractions of any other definite unit of length. In addition to or instead of such indications, I may employ pairs of lines to indicate limits of tolerance zones between which the index must fall if the screw is to be accepted. As illustrated in Figure 43, I may calibrate the scale on my gauge in terms of percentages of a dimension of the screw which is to be measured, such for example, as percentages of normal flank thickness. Since the flank thickness of a screw thread is to a large extent a measure of the shearing strength of the thread, that is, the holding power of the screw, it is apparent that a statement of lead error in terms of fractions of an inch has little meaning except as applied to a screw of defined dimensions. For example, an error of one thousandth of an inch in the flank thickness of a large screw might be negligible whereas the same error in flank thickness of a much smaller screw would be fatal. In order to relate the error readings directly to the size of the screw tested, I may prefer to calibrate the scale in terms of percentages of some dimension of the screw such as flank thickness. Thus a reading of the scale indicates directly the approximate relative holding power of the screw tested compared to a screw of the same size having a perfect thread.

Certain embodiments of this invention having thus been described, it should be evident to those skilled in the art that various changes and modifications might be made therein without departing from its spirit or scope as defined by the appended claims.

I claim:

1. A method of gauging a screw thread, which comprises engaging on substantially spaced turns only of said thread a pair of members each having a loosely fitting thread of approximately one turn normally in a common helix with the thread of the other, moving said members successively into binding contact with the mutually remote flanks of the engaged turns and the mutually adjacent flanks of said engaged turns, and noting the amounts of relative movement between said members required from said normal position to said positions of binding contact.

2. A method of gauging a screw thread, which comprises engaging a pair of loosely fitting threaded gauging members on approximately single turns only of said thread axially spaced apart by several intermediate turns of said thread, moving said members successively into binding contact with the mutually remote flanks of said engaged turns and the mutually adjacent flanks of said engaged turns, and noting the amounts of relative movement between said members required from a normal relative position in which the gauging threads lie in a common helix to said positions of binding contact.

3. A method of gauging a screw thread, which comprises bringing into threaded relation with the thread to be tested a pair of gauge members each having a single turn of thread loosely fitted on the thread to be tested, the threads of the two members being axially spaced and normally lying in a common helix, and noting the limits of relative movement of said members while in threaded relation with the thread to be tested and while so restricted as to their freedom of relative movement that permitted relative movement between the members brings their gauging threads into binding contact with opposite flanks of the thread to be tested.

4. A method of gauging a screw thread, which comprises engaging substantially spaced turns only of said thread with a pair of threaded members, relatively rotating said members as far as possible in both directions while in engagement with the thread to be tested and while so restricted as to freedom of relative movement that permitted relative movement thereof brings their gauging threads into binding engagement with the thread to be tested, and noting the amounts of possible relative rotation.

5. A method of gauging the thread of a screw, which comprises engaging on substantially spaced turns only thereof a pair of internally threaded rings each capable of engaging approximately a single turn only of the thread of a screw to be tested, and noting the limits of possible relative rotation of said rings in both directions while engaging on a screw to be tested and while restricted as to freedom of relative movement such that permitted relative movement of the rings brings their gauging threads into binding engagement with the thread to be tested.

6. A method of gauging a screw thread having a lead error, which comprises engaging with substantially spaced single turns only of said thread a pair of relatively movable threaded gauge members, the threads of which are adapted to be in a common helix, relatively moving said members to binding engagement with a flank of their respective turns of the thread to be tested, the members engaging different flanks of the thread to be tested, relatively moving said members in the opposite direction to binding engagement with the opposite flanks of said respective thread turns, such relative movements taking place while the gauge members are in threaded engagement with the thread to be tested and while the freedom of relative movement between the members is so restricted that permitted relative movement brings the gauging threads into binding contact with the thread to be tested, and noting the amount of relative movement between the two relative positions of binding engagement with the thread to be tested.

7. A method of gauging a screw thread, which comprises engaging substantially spaced single turns only of said thread with a pair of threaded gauge members having threads of approximately one turn adapted to lie in a common helix, relatively moving said members to cause apparent relative axial motion of the threads of said members against opposite flanks of the thread to be tested, relatively moving said members in the opposite direction to cause reversed apparent motion of said threads against the flanks of the thread to be tested, said movements of the members being made while the members are in threaded engagement with the thread to be tested and while their freedom of relative movement is so restricted that permitted relative movement results in apparent relative axial movement of the gauging threads thereof.

8. A method of gauging the thread of a screw, which comprises engaging substantially spaced single turns only of said thread with a pair of threaded rings, each having a loosely fitting thread of approximately one turn, relatively moving said rings to cause apparent mutual axial approach of the threads thereof to a position of binding engagement with the thread to be tested, relatively moving said rings in the opposite direction to cause apparent mutual axial recession of the threads thereof to a position of binding engagement with the thread to be tested, said movements of the members being made while the members are in threaded engagement with the thread to be tested and while their freedom of relative movement is so restricted that permitted relative movement results in apparent relative axial movement of the gauging threads thereof, and noting the amounts of the relative movements of said rings.

9. A method of determining tolerance zones on a screw thread gauge, having two connected relatively movable parts adapted for threaded engagement with a thread to be tested, which comprises successively engaging with said parts two master threads having flank thicknesses respectively on the opposite limits of tolerance for the class of thread desired, but no lead error, relatively moving said parts in both directions to positions of binding engagement with the flanks of the successive master threads while the gauging members are in threaded engagement with one or the other of said master threads and while their freedom of relative movement is so restricted that permitted relative movement thereof causes them to bind on the flanks of the master thread engaged thereby, and indicating all said positions on the parts.

10. A method of determining tolerance zones on a screw thread gauge having two connected relatively movable rings threaded for loosely fitted engagement with a thread of maximum tolerated flank thickness, which comprises successively engaging with said rings a pair of master plug gauges having threads with respectively maximum and minimum tolerated flank thicknesses, relatively moving said rings in both directions to positions of binding engagement with each of said plug gauges when the rings are in threaded engagement with one or the other of said master gauges and while the relative movement of said rings is so restricted that permitted relative movement causes the rings to bind on the flanks of the thread engaged thereby, and indicating such positions with cooperating indicia on the two rings.

11. A screw thread gauge comprising a pair of threaded members adapted to engage a thread to be tested at substantially spaced turns of the thread and to clear the turns between the spaced engaged turns, said gauge including means for restricting the freedom of relative movement of said members so that permitted relative movement thereof causes apparent relative axial movement of the gauging threads thereof, and means for indicating the apparent relative axial movement of the threads of said members resulting from relative movement of the members to positions of binding contact with the flanks of the thread in threaded engagement with said members for testing.

12. A screw thread gauge comprising a pair of members, each having a threaded portion with a thread of approximately one turn adapted to lie in a common helix with the thread of the other and substantially spaced therefrom, said gauge including means for restricting the freedom of relative movement of said members so that permitted relative movement thereof causes apparent relative axial movement of the gauging threads thereof, and means for indicating the apparent relative axial movement of the threads of said members resulting from relative movement of the members from said position in a common helix to positions of binding contact with the flanks of a thread in threaded engagement with said members for testing.

13. A screw thread gauge comprising a pair of threaded gauging members, means for restricting relative movement between said members so that the relative axial progress of the members resulting from any relative movement of the members is less than the apparent relative axial progress of their respective threads, the threaded portions of said members being substantially spaced from each other, and means for measuring the apparent axial movement of the threads resulting from relative movement of the members between positions of binding contact with the flanks of a thread in threaded engagement with said members for testing.

14. A gauge comprising a pair of threaded members each of a pitch diameter sufficiently different from basic and in the proper direction to cause said members to make a loose fit with the maximum screw to be tested, each member being adapted to engage substantially one turn only of a thread to be tested, means for associating said members with their respective gauging threads axially spaced, and restricting the freedom of relative motion thereof so that permitted relative motion of the members causes their gauging threads to move relatively to and from an arrangement in which said gauging threads lie in a common helix, and means for facilitating the comparison of the relative extent of motion from said position permitted when said members are in engagement with substantially spaced turns only of a standard threaded member and in engagement with similarly spaced turns only of a threaded member to be tested.

15. A gauge comprising a pair of threaded members each of a pitch diameter sufficiently different from basic and in the proper direction to cause said members to have a loose fit with the maximum screw to be tested, means for connecting said members so that their threaded portions engage only on substantially spaced turns of a thread to be tested, said connection being by threads of a lead different from the lead of the gauging threads of said members, the gauging threads of said members being so angularly related as to lie in the same helical path when said members are somewhat spaced apart, and means for facilitating the comparison of the permissible extent of relative angular movement of said members in opposite directions when said gauge is applied to a standard threaded member and to a threaded member to be tested.

16. A gauge comprising a pair of internally threaded rings of a size to make a loose fit with the maximum screw to be tested, said rings each having a gauging thread of approximately one turn arranged for engagement with substantially spaced turns only of a screw to be tested, means for restricting the freedom of relative motion of said threaded members so that permitted relative motion thereof causes their gauging threads to move from and to a relative position wherein they lie in a common helix, and means for indicating the permissible extent of relative motion from such position when said members are applied to a threaded member.

17. A screw thread gauge comprising a pair of adjacent thread encircling elements, each having a thread surface of approximately one turn substantially corresponding in pitch and shape to the standard of the screw thread to be tested, said elements being mutually spaced a distance approximately equal to the height of a standard nut so as to engage substantially spaced turns only of a thread to be tested, and cooperating differential screw multiplying means to control the relative axial movement of said elements, said elements having thereon means to indicate the extent of axial separating and approaching movement possessed by said elements from an intermediate position in which said elements form a continuation of the same helix and while said elements are in contact with the screw thread to be tested.

18. A screw thread gauge comprising a plurality of axially spaced loosely fitting thread engaging elements adapted to engage approximately single spaced turns only of a thread to be tested and cooperating screw multiplying means to control the relative axial movement of said elements, said elements having thereon means to indicate the amount of axial slack between said elements and the thread to be tested.

19. A screw thread gauge comprising axially spaced threaded members whose threads may lie in the same helix and which are adapted to be screwed as a unit into loosely fitting engagement with substantially spaced turns only of the thread to be gauged, means for restricting the freedom of relative movement between said members so that permitted relative movement thereof when in threaded engagement with a thread to be gauged moves the gauging threads of said members into binding contact with the flanks of the thread to be gauged, and means for indicating tolerance limits of the proper extent of relative movement of said members while in engagement with said thread to be gauged.

20. A screw thread gauge comprising a pair of relatively rotatable threaded members adapted to be screwed as a unit into loosely fitted engagement with the thread to be tested, means for restricting the freedom of relative motion of said members so that permitted relative motion thereof causes their gauging threads to bind on the flanks of a thread in threaded engagement therewith, and means for facilitating relative rotation of said members, said means including an element releasably attached to one of said members and adapted to release said member before excessive torque is impressed thereon.

JAMES HARTNESS.